United States Patent [19]

Noll et al.

[11] 3,926,744

[45] Dec. 16, 1975

[54] PROCESS FOR THE RECOVERY OF ACRYLIC ACID AND ACROLEIN

[75] Inventors: Ewald Noll, Grosskrotzenburg; Hans Schaefer, Grossauheim; Horst Schmid, Wesseling; Wolfgang Weigert, Offenbach, all of Germany

[73] Assignee: Deutsche Gold- und Silber-Scheideanstalt vormals Roessler, Germany

[22] Filed: Dec. 26, 1973

[21] Appl. No.: 428,304

[30] Foreign Application Priority Data

Dec. 27, 1972 Germany............................ 2263496

[52] U.S. Cl. ...................... 203/55; 203/42; 203/60; 203/63; 203/DIG. 21; 260/526 N; 260/601 R; 260/530 N; 260/533 N
[51] Int. Cl.[2].......................... B01D 3/34; B01D 3/00
[58] Field of Search .......... 203/38, 42, 59, DIG. 21, 203/53, 55, 60, 63, 95, 96; 260/526 N, 601 R, 530 N, 533 N

[56] References Cited
UNITED STATES PATENTS

| | | | |
|---|---|---|---|
| 2,514,968 | 7/1950 | Dunn | 203/42 |
| 3,555,082 | 1/1971 | Sennewald et al. | 260/526 N |
| 3,725,208 | 4/1973 | Noegawa | 203/59 |

*Primary Examiner*—Norman Yudkoff
*Assistant Examiner*—D. Sanders
*Attorney, Agent, or Firm*—Cushman, Darby & Cushman

[57] ABSTRACT

There is provided a process for the recovery of acrylic acid and acrolein from the gas mixture resulting from the catalytic gas phase oxidation of propylene or acrolein by washing the gas mixture with liquids in which at first the acrylic acid is dissolved at higher temperature and then the acrolein is dissolved at lower temperature. The improvement comprises washing the gas mixture for the separation of the acrylic acid at temperatures from about 60° to 120° C. with a washing liquid which is a mixture of water and organic liquid and then washing the gas mixture with a washing liquid which is water or a mixture of water and organic liquid at temperatures between 0° and 30° C. The organic liquid used has a higher boiling point than acrylic acid, does form an azeotrope with water alone, but does not form an azeotrope with acrolein or a mixture of water and acrolein, has slight miscibility with water and forms a solution with acrylic acid in which the acrylic acid has an activity coefficient of less than about 1.5.

7 Claims, 3 Drawing Figures

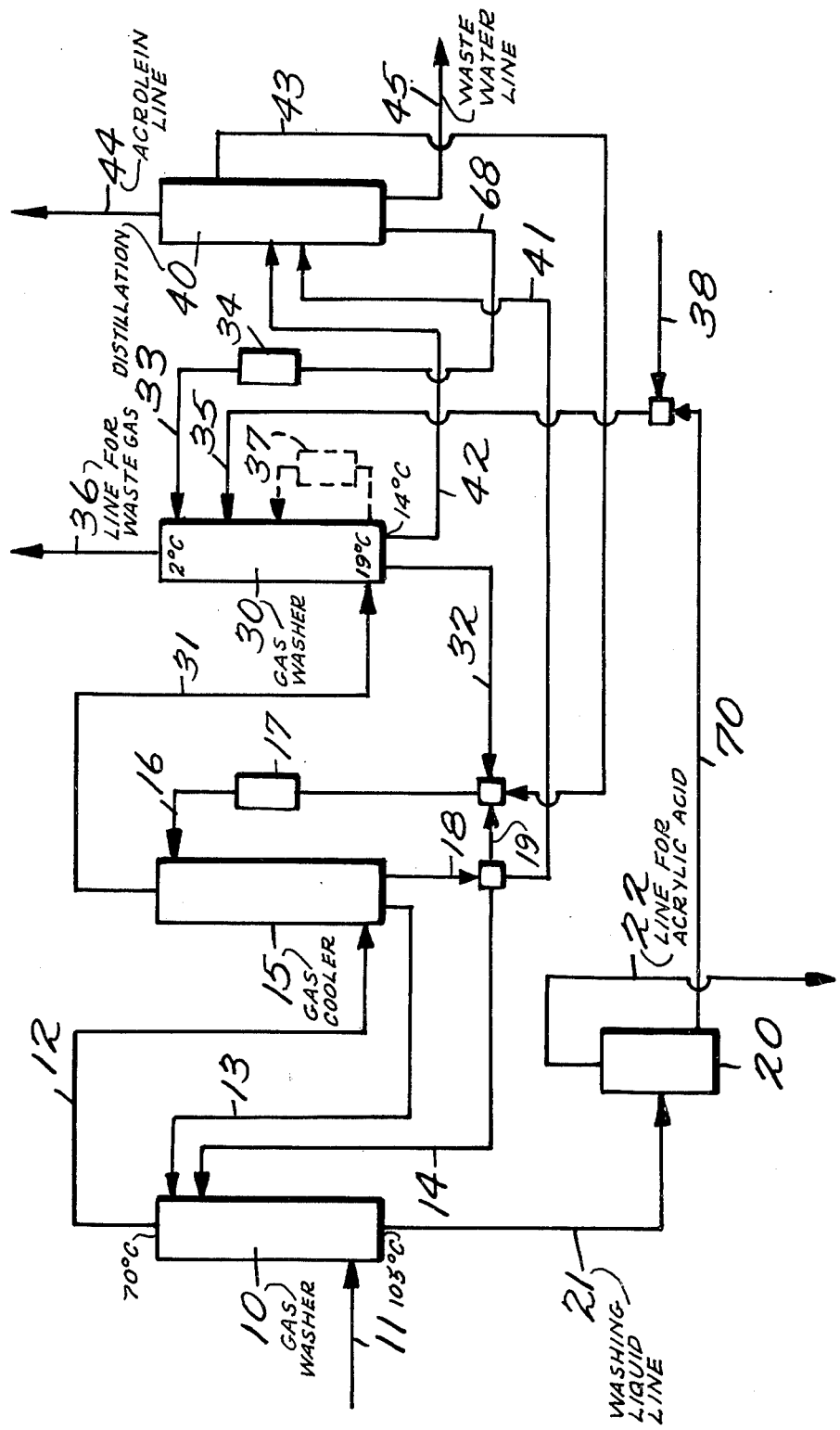

PROCESS FOR THE RECOVERY OF ACRYLIC ACID AND ACROLEIN

The present invention relates to a process for the recovery of acrylic acid and acrolein from the gas mixtures resulting from the catalytic oxidation of propylene or acrolein in the gas phase. This type of gas mixtures generally contains acrylic acid and acrolein together in a portion of about 3 to 8 colume %, small portions of byproducts such as formaldehyde, acetaldehyde, furfural and acetic acid and the remainder air or air constituents, inert gases and steam.

It is known to separate out from these gas mixtures, which generally result at temperatures above 200°C., in a first step the acrylic acid and higher boiling constituents by cooling to 30° to 80° C., in a given case by using a liquid, which is obtained by recycling cooled constituents of the condensate from this first step, and then in a second step the acrolein from the remaining gas mixture by absorption with water at 0° to 30° C. and this to recover from the aqueous solution by distillation, see Shima German Auslegeschrift 1,618,997 (the entire disclosure of which is incorporated by reference). It is also known to separate the acrylic acid from the condensate recovered in the first step by cooling by an extraction with an organic solvent, see Newman German Auslegeschrift 1,443,739 and Meteer German Offenlegungsschrift 1,493,325. The entire disclosures of Newman and Meteer are hereby incorporated by reference. The disadvantage of this process is that after a relatively short time polymers deposit and the equipment is clogged.

It is also known to separate the acrylic acid from the gaseous mixtures by a wash with high boiling liquids which consist essentially of maleic acid esters, polyacrylic acid and esters of polyacrylic acid and to free the solution of acrylic acid formed in these liquids from water, acetic acid, acrolein and formaldehyde by distillation. The object of these processes is the recovery of esters of acrylic acid; the acrylic acid is reacted directly in the solution with alcohols, see Sennewald German Offenlegungsschrift 1,668,362, the entire disclosure of which is incorporated by reference. It is difficult to recover acrylic acid itself from the solutions because polymers separate to a considerable extent.

There has now been developed a process for the recovery of acrylic acid and acrolein from the gas mixture resulting from the catalytic gas phase oxidation of propylene or acrolein by washing the gas mixture with liquids in which at first the acrylic acid is dissolved at high temperature and then the acrolein is dissolved at low temperature. The process comprises washing the gas mixture for the separation of the acrylic acid at temperatures from about 60° to 130° C. with a washing liquid which is a mixture of water and organic liquid and then washing the gas mixture with a washing liquid which is water or preferably a mixture of water and organic liquid at temperatures between 0° and 30° C. The organic liquid used has a higher boiling point than acrylic acid, does form an azeotrope with water alone, but does not form as azeotrope with acrolein or a mixture of water and acrolein, has slight miscibility with water and forms a solution with acrylic acid in which the acrylic acid has an activity coefficient of less than about 1.5. In this process polymeric materials do not separate in month long operation so that the process is outstandingly suited for use in large industrial scale operation.

When a mixture of water and organic solvent is used as a washing liquid, as mentioned above, the amount of organic solvent is usually 20 to 90 % by volume. As pointed out, infra, the exact amounts will depend on the particular organic solvent and the temperature and concentration of the gas mixture.

As organic liquids there can be employed organic materials or mixtures of organic materials which are liquid under the conditions of the gas wash, boil above the boiling point of the acrylic acid, at atmospheric pressure (760 mm) preferably have a boiling point between 150° and 220° C., do form an azeotrope with water but do not form an azeotrope with acrolein and a mixture of acrolein and water, which are slightly miscible with water and which result in solutions with acrylic acid in which the acrylic acid has an activity coefficient which is less than about 1.5, preferably about 1.0 to 0.05. Preferred are monovalent aliphatic alcohols having 4 to 10 carbon atoms, e.g., alkanols having 6 to 10 carbon atoms such as hexyl alcohol, heptyl alcohol, octyl alcohol, isooctyl alcohol, 2-ethylhexyl alcohol, decyl alcohol, nonyl alcohol, the acetic acid esters of such aliphatic alcohols, e.g., alkanols having 5 to 10 carbon atoms, including amyl acetate, hexyl acetate, heptyl acetate, octyl acetate, isooctyl acetate, 2-ethylhexyl acetate, nonyl acetate, decyl acetate, isodecyl acetate, and acrylic acid esters of such aliphatic alcohols, e.g., alkanols having 4 to 10 carbon atoms including butyl acrylate, amyl acrylate, hexyl acrylate, isohexyl acrylate, heptyl acrylate, octyl acrylate, isooctyl acrylate, 2-ethylhexyl acrylate, decyl acrylate and isodecyl acrylate. In a given case mixtures of these alcohols and/or esters can be used.

The process of the invention is selectively a process for recovery of acrylic acid or acrolein with the limitation that the acrolein can only be recovered from the acrylic acid containing gas mixture if the acrylic acid is first separated out.

To carry out the process of the invention there can be used conventional gas washing apparatus. The gas washing generally takes place at atmospheric pressure but it can be carried out, however, at lower or higher pressures. It is not necessary but in many cases it is suitable to precool the gas mixture to about 140° to 200° C. before leading it to the gas wash.

To separate the acrylic acid, the gas mixture is washed with a washing fluid which is a mixture of water and organic liquid. The amounts of water and organic solvent are adjusted essentially according to the temperature and concentration of the gas mixture and the type of organic liquid and are so chosen that they are sufficient to absorb the acrylic acid and regulate the temperature in the gas wash between about 60° and 130° C., preferably between 80° and 105° C. For example, using 2-ethylhexanol as the organic liquid, generally there are added mixtures which consist of about 0.1 to 3.0 parts by volume of water per part by volume of organic liquid and there is used about 0.2 to 1.0 part by volume of these mixtures per 1000 parts by volume of gas mixture under normal conditions. The recovery of the acrylic acid absorbed in the wash liquid can take place in customary manner by distillation.

After the separation of the acrylic acid the remaining gas mixture is washed with a washing liquid which is water or preferably a mixture of water and an organic liquid. The amount of water or water and organic liquid is regulated essentially according to the temperature and concentration of the gas mixture and in a given case on the type of organic liquid and are chosen so that they are at least sufficient for the absorption of acrolein and to regulate the temperatures in the gas wash between about 0° and 30° C. The recovery of the acrolein absorbed in the wash liquid can take place in customary manner by distillation.

The wash liquid used to separate the acrylic acid or the acrolein from the gas mixture and then freed from the acrylic acid or acrolein can be used directly without further treatment again as the gas wash liquid.

FIG. 2 illustrates a preferred continuous method of operation; and

Figure 1:
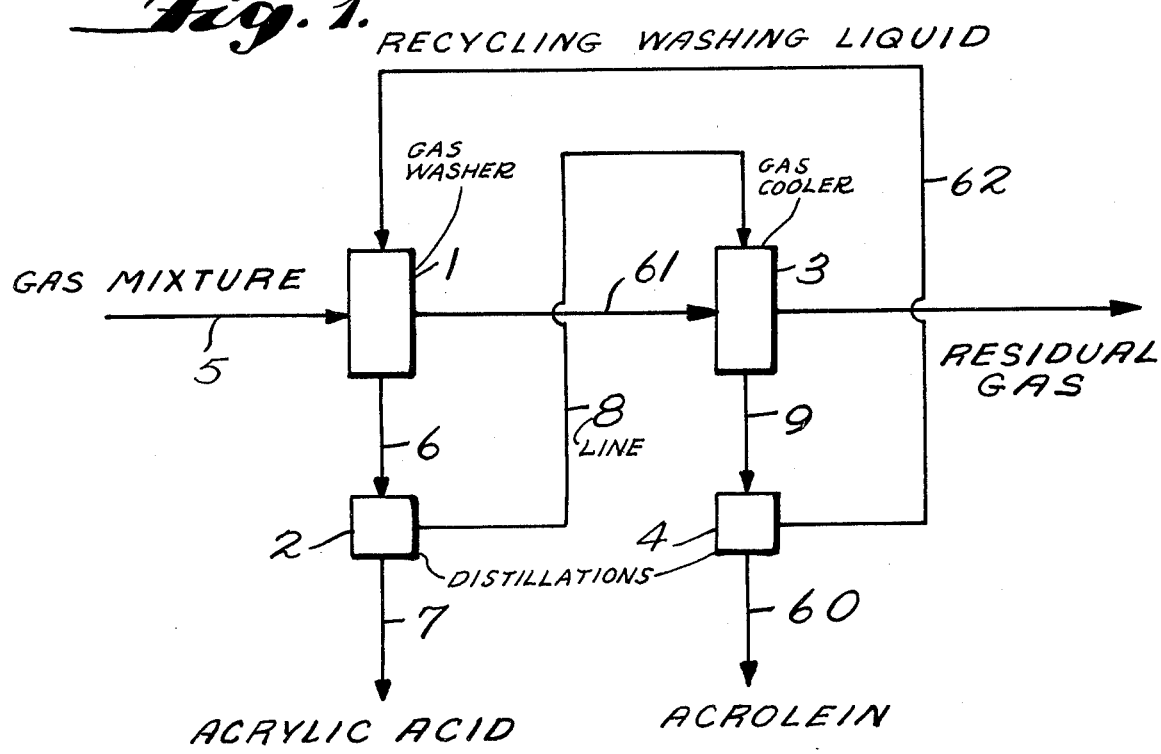
FIG. 1 is a diagrammatic illustration of one form of the invention.

In the cases in which both acrylic acid and acrolein are recovered from the gas mixture, it can be advantageous to so recycle the wash liquid that it first serves to separate the acrylic acid in gas washer 1 from the gas mixture entering via line 5. The wash liquid containing acrylic acid goes via line 6 to distillation unit 2 where the acrylic acid is removed, e.g., by distillation, through line 7. The wash liquid freed from the acrylic acid goes via line 8 to gas cooler 3 where it serves to separate the acrolein from the gas mixture entering via line 61. The acrolein containing wash liquid goes via line 9 to distillation unit 4 where the acrolein is removed, e.g., by distillation, through line 60. The wash liquid freed from the acrolein is finally returned via line 62 to gas washer 1 for separation of acrylic acid. The individual steps of the process can be operated independently of each other either in continuous or discontinuous manner. For the preferred continuous operation, there can be employed for example equipment according to FIG. 2.

A gas washer 10 is supplied from line 11 with the gas mixture to be separated and is supplied via lines 13 and 14 with washing liquid that serves to separate out the acrylic acid from the gas mixture. The washing liquid running out of the gas washer via line 21 is introduced into a unit 20, e.g., a distillation column, to recover the acrylic acid which is removed via line 22. The remaining gas mixture substantially freed from the acrylic acid and which now is laden with an azeotropic mixture of water and organic liquid goes via line 12 into gas cooler 15. It is cooled with wash liquid entering through line 16 after being cooled in cooler 17. Thereby there is removed from the gas mixture a residual portion of acrylic acid and a part of the acrolein as well as the water vapor (steam). The remaining residual gas goes via line 31 to the gas washer 30.

The wash liquid discharged from the gas cooler 15 is separated into an organic phase which leaves via line 13 and the aqueous phase which leaves via line 18. The organic phase and a portion of the aqueous phase (the latter via line 14) enter the gas washer 10 as wash liquid. The aqueous phase is thereby suitably so regulated that somewhat more water is present in the gas washer 10 as is required to form the azeotropic mixture of water and organic fluid which is removed with the gas stream via line 12 from gas washer 10.

A further portion of the aqueous phase discharged from the gas cooler is led via line 41 to the distillation column 40. The substantial portion of the aqueous phase returns via line 19 by way of cooler 17 as washing liquid through line 16 into the gas cooler 15 in cyclic fashion. To this portion of the aqueous phase is added the acrolein containing organic phase leaving distillation column 40 via line 43 and the organic phase discharging from the gas washer 30 via line 32. The wash liquid in line 16 and the cooling in cooler 17 are suitably so regulated that the gases leaving the gas cooler have a temperature between about 15° to 25° C, at most 40° C.

In the gas washer 30, the residual gas entering via line 31 is washed with the water supplied via line 33 coming from distillation column 40 via line 68, and by way of cooler 34 and with organic liquid coming via line 70 and 35 from unit 20 where it has been freed from acrylic acid. Of the washing liquid discharged from the gas washer 30, after phase separation, the organic phase goes to the gas cooler 15 via line 32, the aqueous phase goes via line 42 to the distillation column 40. The waste gas leaving the gas washer via line 36 is discarded. If necessary, the gas washer 30 is cooled. The cooling can take place by cooling elements in the inner space or in a given case by cooling of a partial stream of the wash liquid outside the gas washer in a cooler 37. The amount of washing fluid in line 33 and in line 35 and its temperature and the cooling in the gas washer itself or in a given case in the partial stream cooler 37 is so regulated that the waste gas is as free as possible from acrolein and on the other hand the aqueous phase in line 42 has as high as possible a concentration of acrolein. There is led to the distillation column 40 the portion of the aqueous phase leaving the gas cooler 15 via line 41 and the aqueous phase leaving the gas washer 30 via line 42. The acrolein is recovered from the top of the distillation column in gaseous form via line 44. It is accompanied by the acetaldehyde present as a byproduct. There accrues out of the upper half of the column an acrolein concentrate which contains organic liquid in addition to water and which is drawn off via line 43. From the bottom of the column water is drawn off via line 68 and the water goes through cooler 34 and line 33 to the top of gas washer 30. The acrolein concentrate enters the gas cooler 15 and the water as stated, enters the gas washer 30. Since steam is constantly supplied with the gas mixture in line 11, a corresponding portion of water from the bottom of column 40 is discarded via line 45. To compensate for possible loss of organic liquid, there is added if necessary fresh organic liquid via line 38. In the unit 20 the recovery of the acrylic acid from the washing liquid running out of the gas washer 10 via line 21 it may be a matter of a simple distillation. The acrylic acid obtained thereby generally contains water, acetic acid, formaldehyde, acrolein and furfural as impurities and must if necessary be subjected to a purification in customary manner. By an especially preferred development of the process of the invention according to FIG. 3 it is, however, possible to directly recover very pure acrylic acid from the wash liquid.

Although this manner of operating the process is designed especially for the recovery of acrylic acid from the wash liquid, which is obtained in the process of this invention by separation of the acrylic acid by gas wash, it can also be used for the recovery of acrylic acid from solutions of other origin.

For example these are solutions which are obtained by an extraction according to Meteer German Offenlegungsschrift 1,493,325. The prerequisite is that it is a matter of using as the solvent an organic liquid which has a higher boiling point than acrylic acid, does form an azeotrope with water but does not form an azeotrope with acrolein or with water and acrolein, is slightly miscible with water and gives solutions with acrylic acid and in which the acrylic acid has an activity coefficient of less than about 1.5.

For the recovery of the acrylic acid from the organic liquid it is generally advantageous that the acrylic acid be present in a concentration of at least about 10 weight %. If necessary, the concentration is increased correspondingly by distillation of a part of the organic liquid in the presence of water. In a given case for this purpose in the gas washing according to the invention a fractionating column is attached to the gas washer 10.

Figure 3:
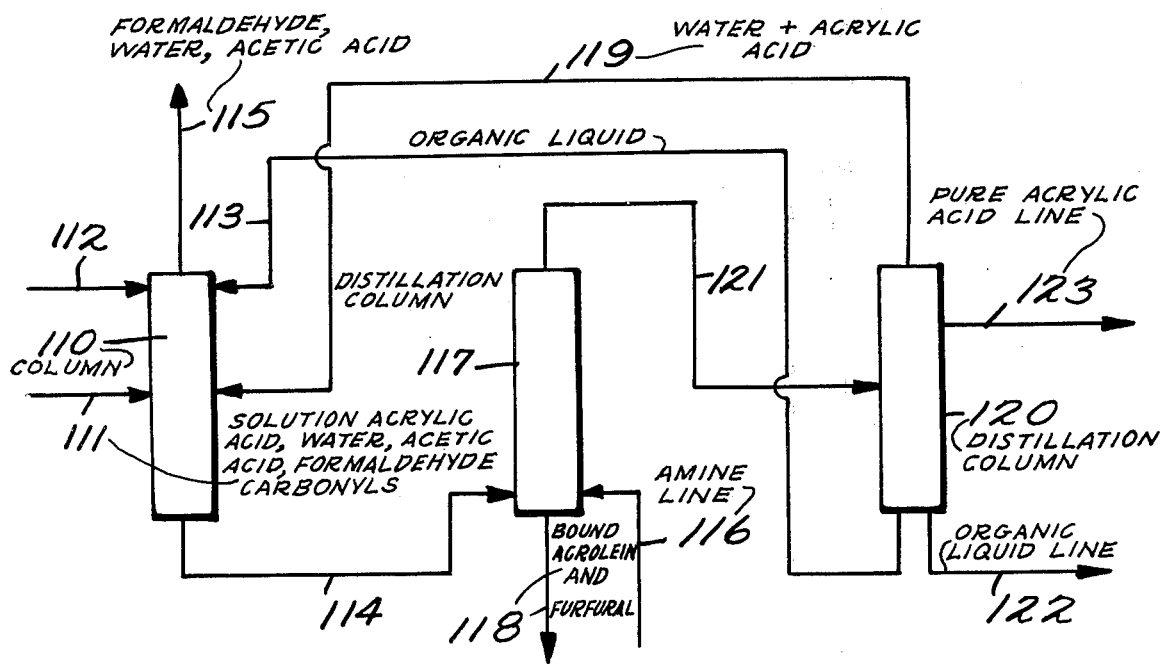
FIG. 3 illustrates an preferred form of the work up of the organic solution of the acrylic acid.

As shown in FIG. 3 the resulting solution in line 111 generally contains besides acrylic acid, water, acetic acid, formaldehyde and additional carbonyl compounds. They are next supplied to a column 110. Water is fed to this column via line 112 and pure organic liquid via line 113. The column is operated at pressures of about 50 to 150 Torr. It serves in its lower part for the separation of water so that there drains from the column a solution of acrylic acid in water free organic liquid via line 114. In its upper part the column 110 effects an extractive distillation. Water, acetic acid and formaldehyde are driven out and leave via line 115.

The organic liquid draining from the column 110 via line 114 contains acrolein and furfural as impurities. These are bound in the subsequent distillation in column 117 by amines added through line 116 according to the process of German Offenlegungsschrift 2,235,326 and corresponding Dehnert U.S. application Ser. No. 380,664, filed July 19, 1973 and precipitate out and leave through line 118. The entire disclosure of the Dehnert U.S. application is hereby incorporated by reference. Thus, there can be used primary and secondary aliphatic and aromatic amines as well as inorganic amines, e.g., hydrazine, hydroxylamine, 1,2-ethanolamine, 1,2-ethylene diamine, octyl amine, 1,3-propanolamine, 1,2-propanolamine, octadecyl amine, aniline, p-phenylene diamine, o-phenylene diamine, 1,2-dianilino ethane, alpha naphthyl amine, beta naphthyl amine, p-methyl aniline, o-methyl aniline, N-methyl aniline, semicarbazide, phenyl hydrazine or 2,4-dimethyl aniline. There is used about 0.5 to 5 equivalents, preferably 1 to 3 equivalents of amine for each equivalent of carbonyl compound present.

The distillate leaving distillation column 117 via line 121 which is a pure mixture of acrylic acid with the organic liquid, but which contains water arising from the reaction in column 117 reaches the distillation column 120. From this column the organic liquid is drawn off at the bottom. A small part goes via line 113 to the column 110 and the rest via line 122, for example, restored as washing liquid, can serve for a gas wash. From the column 120 the pure acrylic acid is recovered via line 123 as distillate. The water containing acrylic acid leaving the top of the column goes via line 119 into the column 110.

In the event that alcohols are used as the organic solvent according to the invention esters are formed in small amounts. These generally remain in the organic liquid and in a given case are recycled with these alcohols.

A further development of the process of the invention concerns the recovery of acrylic acid esters in place of acrylic acid in the case where alcohols are used as the organic liquid, e.g., decyl acrylate, 2-ethylhexyl acrylate, isooctyl acrylate and hexyl acrylate. There are inserted in the column 110 customary esterification catalysts, for example, ion exchange resins, e.g., sulfonated sytrene-divinyl benzene copolymer. There is obtained the ester from column 120 as a special fraction.

The data contained in the following examples are average values under stationary conditions in continuous operation. The amounts set forth are the hourly throughputs.

EXAMPLE 1

There were supplied to a reactor held at a temperature of 328° C. for the customary catalytic oxidation a mixture of 7160 liters of air, 766 liters of 94% propylene and 1170 grams of steam.

The gas mixture recovered contained 0.5 volume % acrylic acid, 4.7 volume % acrolein, 0.4 volume % formaldehyde, 0.16 volume % acetic acid and less than 0.2 volume % together of acetaldehyde and furfural. To obtain acrylic acid and acrolein from the gaseous mixture the process illustrated in FIG. 2 was carried out. As the organic liquid there was added 2-ethylhexanol. (Actually there was recycled a mixture of 2-ethylhexanol and 2-ethylhexyl acrylate because of the partial esterification of the alcohol as indicated above).

The gaseous mixture was led into the bottom of a gas washer 10 which was made of a tube 0.1 meter in diameter and 4 meters high, which was filled in its lower part with Raschig rings and in its upper part was provided with 10 bubble trays. The gas washer was charged at the top with a washing liquid which consisted of 1180 grams of organic phase from line 13 and 1830 grams of aqueous phase from line 14 both of which came from gas cooler 15. The gas washer was heated in its lower part so that the liquid in the sump had a temperature of 105° C. There were drawn off 1006 grams of wash liquid via line 21 having an acrylic acid content of 135 grams and supplied to the unit 20 for working up acrylic acid.

The residual gas in line 12 left the gas washer 10 with a temperature of 70° C. It was introduced into the bottom of the gas cooler 15 which was a tube having a diameter of 0.1 meter and a height of 1 meter and which was filled with Raschig rings. In this the gas was cooled by 60 kg of wash liquid from line 16 and having a temperature of 16° C. which was delivered at the top. The wash liquid at the bottom of the cooler had a temperature of 45° C.

The residual gas in line 31 left the gas cooler 15 with a temperature of 19° C. It was introduced into the bottom of the gas washer 30. As the gas washer there served a tube 0.1 meter in diameter and 7 meters high which was filled with Raschig rings. There were fed into the top of the gas washer 10,875 grams of water from line 33 at 2° C. and 2 meters below the top 746 grams of 2-ethyl hexanol from line 35 at 2° C. There were drawn off from the gas washer from below 12,030 grams of aqueous phase via line 42 and 752 grams of organic phase via line 32 with a temperature of 14° C. The waste gas leaving the gas washer from above via line 36 contained 5 grams of acrolein.

There were recovered from the top of distillation column 40 1155 grams of distillate via line 44. This consisted of 91 weight % acrolein, 3.5 weight % acetaldehyde and 5.5 weight % water. There were drawn off from the upper half of the column 133 grams of acrolein concentrate via line 43 which contained 80 weight % of acrolein and the remainder consisted of acetaldehyde, 2-ethyl hexanol and water. Of the 12,750 grams of water which accumulated at the bottom of the column, 10,875 grams were led into the gas washer 30 and 1875 grams rejected. The water contained no acrolein, but 0.17 weight % acrylic acid and 0.19 weight % acetic acid.

The liquid drawn off from the gas washer 10 via line 21 was distilled to recover the acrylic acid. As distillate in line 22 there accumulated a mixture of 135 grams of acrylic acid, 35 grams of acetic acid, 90 grams of water, 18 grams of 2-ethyl hexanol and small amounts of acrolein, formaldehyde and furfural. Additionally there were recovered 720 grams of 2-ethyl hexanol in the distillation (as bottoms). To this were added 26 grams of fresh 2-ethyl hexanol to make up for losses and then led into the gas washer 30.

EXAMPLE 2

The procedure was carried out as in Example 1. However, there was used for comparison as the wash liquid water in place of a mixture of water and 2-ethyl hexanol. The gas washer 10 was eliminated; the gas mixture was led directly to the gas cooler 15. From this there was recovered 2010 grams of aqueous solution via line 41 which contained 6.5 weight % acrylic acid, 4.0 weight % acrolein, 1.9 weight % acetic acid, as well as some formaldehyde and furfural. This aqueous solution was not led to the distillation column 40; but the acrolein was recovered from it in a special distillation and this was returned into the gas cooler 15. There accumulated from the distillation column 40 a distillate which had the same composition as the distillate according to example 1.

After operating for 25 days all inner surfaces of the apparatus, especially the heat exchange surfaces, were so strongly encrusted that the plant was shut down and had to be purified. In contrast by using the method operation of example 1 after 6 months operation there was still no formation of incrustation.

EXAMPLE 3

According to the procedure of example 1 there were drawn off from the gas washer 10 1006 grams of wash liquid which contained 135 grams of acrylic acid, 35 grams of acetic acid, 90 grams of water and less than 2 grams of acrolein, formaldehyde and furfural. For the recovery of acrylic acid from this solution the process was carried out as shown in FIG. 3.

The solution in line 111 was led into the middle of column 110 for the separation of acetic acid, formaldehyde and water. The column had a diameter of 0.1 meter and a height of 6 meters, was filled in the lower part with Raschig rings and in the upper part was filled with bubble trays. In the column further above, there were fed in 60 grams of water and 507 grams of 2-ethyl hexanol and in the middle of the column there were fed 115 grams of water containing acrylic acid from column 120. The column 110 was operated at 70 Torr. There was recovered a distillate from the top via line 115 an aqueous solution which contained 19 weight % acetic acid, 2 weight % acrylic acid, formaldehyde and some acrolein and additionally 2-ethyl hexanol. After separation of the phases the 2-ethyl hexanol was returned into the column 110.

From the foot of column 110 there was drawn off a water free solution of acrylic acid in 2-ethyl hexanol via line 114. This was cooled to 20° C., treated with 2.6 grams of aniline and then distilled at 160° C. over a thin layer evaporator. The distillation residue of 32 grams which was withdrawn via line 118 contained besides aniline the residual carbonyl compounds as well as polymers and was discarded. The distillate in line 121 was fed into middle of a further column 120 which was formed in the same manner as column 110 but which was operated at 30 Torr.

By a side withdrawal in the upper half of this column, there were recovered 133 grams of pure acrylic acid. This was free of acetic acid and carbonyl compounds and as good as free of water and 2-ethyl hexanol. It was stabilized by addition of 200 ppm of hydroquinone monomethyl ether. There were drawn off 460 grams of water containing acrylic acid from the top of the column. This was stabilized with 500 ppm of hydroquinone: 115 grams of this acrylic acid was led into the column 110, the remaining 345 grams were returned to the column 120. There were drawn off from the foot of column 120 1245 grams of 2-ethyl hexanol. Of this 507 grams were led back into column 110. The remainder was available for renewed addition to the gas wash. It was a mixture of 89 weight % 2-ethyl hexanol and about 11% of 2-ethyl hexyl acrylate.

EXAMPLE 4

The aqueous solution of acrylic acid recovered according to example 2 was extracted with 2300 grams of 2-ethyl hexanol and then concentrated by an azeotropic distillation with water to such an extent that a solution of acrylic acid in 2-ethyl hexanol was formed which had the same composition as the solution in line 111 from which the acrylic acid was recovered according to example 3. For the rest the procedure was the same as in example 3 and a consistent result produced.

What is claimed is:

1. In a process for the recovery of acrylic acid and acrolein from the gas mixture resulting from the catalytic gas phase oxidation of propylene or acrolein by washing the gas mixture with a liquid in which at first the acrylic acid is dissolved at higher temperature and then the acrolein is dissolved at lower temperature, the improvement comprising:
   1. washing the gas mixture for the separation of the acrylic acid at temperatures from 60° to 130° C. with a washing liquid which is a mixture of water and organic liquid; and then
   2. washing the gas mixture with a washing liquid which is water or a mixture of water and organic liquid at temperatures between 0° and 30° C., said organic liquid in steps (1) and (2) having a higher boiling point than acrylic acid, forming an azeotrope with water alone, but not forming as axeotrope with acrolein or a mixture of water and acrolein, having slight miscibility with water and forming a solution with acrylic acid in which the acrylic acid has an activity coefficient of less than about 1.5.

2. A process according to claim 1 wherein said organic liquid forms a solution with acrylic acid in which the acrylic acid has an activity coefficient of about 1.0 to 0.05.

3. A process according to claim 1 wherein the organic liquid is monohydric aliphatic alcohol having 4 to 10 carbon atoms, an acetic acid ester of such an alcohol or an acrylic acid ester of such an alcohol.

4. A process according to claim 3 wherein the organic liquid is an alkanol of 6 to 10 carbon atoms, an alkyl acetate having 5 to 10 carbon atoms in the alkyl group or an alkyl acrylate having 4 to 10 carbon atoms in the alkyl group.

5. A process according to claim 4 wherein the organic liquid is 2-ethyl hexanol, 2-ethyl hexyl acrylate or a mixture of 2-ethyl hexanol and 2-ethyl hexyl acrylate.

6. A process according to claim 1 comprising employing the washing liquid first to separate the acrylic acid from the gas mixture, freeing the washing liquid from the acrylic acid, employing the thus freed washing liquid to separate the acrolein, freeing the washing liquid from the acrolein and recycling the finally freed washing liquid to again separate acrylic acid from the gas mixture.

7. A process according to claim 6 wherein the acrylic acid solution in wash liquid also contains water, acetic acid, formaldehyde and higher boiling carbonyl compounds as impurities, subjecting the solution to distillation to remove water, acetic acid and formaldehyde, adding an amine having at least one hydrogen attached to the amino group to react with the residual carbonyl compounds, distilling to separate the acrylic acid and organic liquid from the amine-carbonyl compound reaction product and then distilling off the acrylic acid from the acrylic acid-organic liquid mixture leaving as a residue the organic liquid.

* * * * *